United States Patent

Morimoto et al.

[11] Patent Number: 6,031,034
[45] Date of Patent: Feb. 29, 2000

[54] POLYPROPYLENE-BASED RESIN COMPOSITION

[75] Inventors: Akihiro Morimoto, Asahikawa; Teruhiko Doi, Konan; Kenichi Ohkawa, Ichihara, all of Japan

[73] Assignee: Sumitomo Chemical Company, Limited, Osaka, Japan

[21] Appl. No.: 09/061,164

[22] Filed: Apr. 17, 1998

[30] Foreign Application Priority Data

Apr. 18, 1997 [JP] Japan ..................... 9-101620

[51] Int. Cl.$^7$ ..................... C08K 5/17
[52] U.S. Cl. .......... 524/108; 524/247; 524/310; 524/450; 524/451; 524/445; 524/447
[58] Field of Search ................. 524/445, 447, 524/450, 451, 108, 247, 310

[56] References Cited

U.S. PATENT DOCUMENTS

| | | |
|---|---|---|
| 4,839,408 | 6/1989 | Fukui et al. |
| 4,891,392 | 1/1990 | Abe et al. ............... 523/300 |
| 5,001,182 | 3/1991 | Maruya et al. ........... 524/451 |
| 5,045,589 | 9/1991 | Ueno et al. ............. 524/505 |
| 5,086,100 | 2/1992 | Fukui .................... 4/445 |
| 5,141,995 | 8/1992 | Komori et al. .......... 524/451 |
| 5,354,795 | 10/1994 | Ueno et al. ............ 524/451 |
| 5,837,764 | 11/1998 | Akagawa et al. ........ 524/451 |
| 5,851,682 | 12/1998 | Kotani et al. .......... 524/437 |

FOREIGN PATENT DOCUMENTS 1-282233A  11/1989  Japan.

*Primary Examiner*—Veronica P. Hoke
*Attorney, Agent, or Firm*—Birch, Stewart, Kolasch & Birch, LLP

[57] ABSTRACT

A polypropylene-based resin composition comprising:

(A) 50% by weight or more of a polypropylene-based resin;

(B) 1 to 40% by weight of an inorganic filler; and (C) 0 to 40% by weight of an ethylene-α-olefin random copolymer rubber and/or a vinyl aromatic compound-containing rubber, the total amount of (A), (B) and (C) being 100% by weight, and (D) as antistatic agents, a glycerin $C_{16}$–$C_{18}$ monofatty acid ester wherein the $C_{18}$ content is 50% by weight or more; a diglycerin $C_{16}$–$C_{18}$ fatty acid ester wherein the $C_{18}$ content $C_{16}$–$C_{18}$ alkyldiethanolamine wherein the $C_{18}$ content is 50% by weight or more.

4 Claims, No Drawings

POLYPROPYLENE-BASED RESIN COMPOSITION

BACKGROUND OF THE INVENTION

1. Filed of the Invention

The present invention a polypropylene resin composition having excellent thermal aging resistance, weatherability and antistatic property, wherein the amount of components vaporized from the resin (referred to as "thermal vaporization property") is small when used at high temperature.

2. Prior Art

A polypropylene resin is widely used for a molded article, film, fiber and the like because of its excellent mechanical properties and easy processability, however, has defects that since it is an electric insulator, once charged static electricity does not easily flow off and consequently trash and dust tend to adhere to the surface of a product, in addition to degradation easily caused by the action of heat and light (mainly, ultraviolet ray).

To solve the defects, it is known to add a phenol-based antioxidant, phosphorus-based antioxidant, sulfur-based antioxidant or the like, alone or in combination to polypropylene, for preventing degradation due to heat, and to add a salicylate, benzophenone-based compound, benzotriazole-based compound, hindered amine-based compound and the like as a weather resistant stabilizer, alone or in combination to polypropylene, for preventing degradation due to a light, and in addition, it is also known to optionally use antistatic agents such as an alkyldiethanolamine, fatty acid diethanolamide, glycerin monofatty acid ester and the like, alone or in combination thereof.

With recent expansion of use of polypropylene, it is often practiced to add an antistatic agent so that trash and dust do not easily adhere to the surface of a molded article, in addition to the addition of a synthetic rubber, inorganic filler, pigment and the like for improving mechanical properties thereof and ability, appearance and the like of the molded article. Further, requirements regarding thermal resistance and weatherability have been increasing, and a compounding which is intended to be used under higher temperature than ever is required.

However, it is clear that a molded article made of a composition in which these antioxidant, weather resistant agent and antistatic agent are compounded causes various problems that sufficient result can not be obtained by complicated interaction of the additives in a polypropylene, and further, that tone deteriorates, environmental pollution occurs due to vaporization of a part of the additives when used at high temperature.

SUMMARY OF THE INVENTION

In view of the above situation, the object of the present invention is to provide a polypropylene-based resin composition excellent in thermal resistance, weatherability and antistatic property, and simultaneously having a small thermal vaporization property.

The present inventors have intensively studied for solving the above-described problems, and as a result, found that the above-described object can be obtained by specifying resin composition, antioxidant and antistatic agent and further by compounding a specific weather resistant stabilizer, and completed the present invention.

The present invention provide a polypropylene-based resin composition comprising:

(A) 50% by weight or more of a polypropylene-based resin;

(B) 1 to 40% by weight of an inorganic filler; and (C) 0 to 40% by weight of an ethylene-α-olefin random copolymer rubber and/or a vinyl aromatic compound-containing rubber, the total amount of (A), (B) and (C) being 100% by weight, and satisfying the following conditions (1) to (4):

(1) the weatherability measured according to JIS B 7753 is 500 hours or more;

(2) the thermal resistance measured at 150° C. according to JIS K7212 is 700 hours or more;

(3) the surface resistivity measured according to JIS K 6911 is $2 \times 10^{15}$ Ω or less; and (4) the thermal vaporization property (Glass haze degree according to ASTM-E308, 100° C.×20 hours) is 15% or less.

DETAILED DESCRIPTION OF THE INVENTION

As a polypropylene-based resin used in the present invention, known polypropylene-based resins, for example, a crystalline polypropylene, a crystalline propylene-ethylene random copolymer, a crystalline ethylene-propylene block copolymer and the like are listed. The crystalline ethylene-propylene block copolymer is preferable. The crystalline ethylene-propylene block copolymer is composed of a crystalline polypropylene portion as a first segment and an ethylene-propylene random copolymer portion as a second segment. The crystalline ethylene-propylene block copolymer is usually produced, for example, by polymerizing propylene in the presence of a stereoregular olefin polymerization catalyst (Zieglar-Natta catalyst) in the first step to produce the first segment, and then copolymerizing propylene and ethylene in the second step to produce the second segment. Preferable physical properties and composition properties of the block copolymer are as follows.

The crystalline polypropylene portion of the ethylene-propylene block copolymer preferably has an intrinsic viscosity in a 135° C. tetralin solution of 0.8 to 2.0 dl/g. When the intrinsic viscosity is over 2.0 dl/g, melt flow rate of the composition and flowability decrease, filling time in molding become longer, and further, a molded article having excellent surface quality is not sometimes obtained. On the other hand, when less than 0.8 dl/g, physical properties such as elongation and impact strength intend to become low, and preferable results are not sometimes obtained. Further, an isotactic pentad fraction determined by $^{13}$C-NMR is preferably 0.97 or more, more preferably 0.98 or more. When the ratio is not less than 0.97, rigidity and thermal resistance are high, and preferably results are obtained. The amount of ethylene contained in the block copolymer is preferably 1 to 30% by weight, and the amount of ethylene contained in the ethylene-propylene random copolymer segment is preferably 15 to 70% by weight.

For use where impact resistance is particularly required, as the polypropylene-based resin, the above-described crystalline ethylene-propylene block copolymer is preferably used.

The block copolymer can be produced by a slurry polymerization and a gas-phased polymerization. For use where high impact resistance is particularly required, it is necessary to increase the amount of the second segment, and the gas-phase polymerization is suitably adopted for the production. A polypropylene-based resin having a high impact resistance by the gas-phase polymerization can be produced, for example, according to a method exemplified in JP-A-

61-287917. The amount of the second segment is preferably 10 to 30% by weight in the slurry polymerization and 10 to 50% by weight in the gas-phase polymerization.

Inorganic fillers include talc, mica, calcium carbonate, wallastonite, glass fiber and the like. Among them, talc having an average particle size of 4.0 µm or less, preferably 3.5 to 1.0 µm is desired in view of improving effect of rigidity, appearance and the like. When it is more than 4.0 µm, decrease in impact resistance of a molded article is sometimes caused, and utility is deficient because talc having an average particle size of less than 1.0 µm is not commercial available usually.

The amount of talc used is 1 to 40% by weight, and when more than 40% by weight, impact resistance undesirably decreases.

As a monomer to be copolymerized with ethylene in the ethylene-α-olefin random copolymer rubber optionally used in the present invention, an a-olefin having 3 or more carbon atoms, preferably 3 to 10 carbon atoms, for example, propylene, 1-butene, 4-methylpentene-1, 1-hexene are listed. Further, this ethylene-α-olefin random copolymer rubber may be copolymerized with a small amount of a non-conjugated diene monomer, for example, 5-ethylidene-2-norbornene, dicyclopentadiene, 1,4-hexadiene or the like, within the range of an iodine value of about up to 15.

Further, as the vinyl aromatic compound-containing rubber optionally used in the present invention, there can be used known ones, for example, conjugated diene compound-vinyl aromatic compound random copolymer rubbers such as styrene-butadiene rubber (SBR), conjugated diene compound-vinyl aromatic compound block copolymer rubbers such as styrene-butadiene-styrene rubber (SBS), styrene-isoprene-styrene rubber (SIS) and hydrogenated block or random copolymer rubbers obtained by hydrogenation of conjugated diene compound in these copolymers. Further, there can also be suitably used rubbers obtained by graft-reacting a vinyl aromatic compound such as styrene and the like to an ethylene-propylene-non-conjugated diene rubber (EPDM).

These ethylene-α-olefin random copolymer rubbers and/or vinyl aromatic compound-containing rubbers can be used in admixture of two or more depending on flowability of the composition, impact strength and hardness of the molded article which are intended in the present invention. The amount used is 0 to 40% by weight, and when over 40% by weight, decrease in rigidity of the molded article unfavorably become large.

In the present invention, it is necessary that the above-described polypropylene-based composition satisfies all of the conditions (1) to (4) mentioned above.

When the weatherability is less than 500 hours, the use of composition in the outdoors is limited.

When the thermal resistance is less than 700 hours, the use of composition at relatively high temperature is limited.

When the surface resistivity of the composition is more than $2 \times 10^{15}$ Ω, trash and dust tend to adhere to the surface of the product.

Furthermore, the thermal vaporization property (Glass haze degree according to ASTM-E308, 100° C.×20 hours) exceeds 15%, the environmental pollution, dim of transparent sheets or plates caused by vapor of the additives contained in the resin composition or the like becomes remarkable.

Next, methods for producing the composition satisfying conditions (1) to (4) will be explained.

As a weather resistant stabilizer used for giving an excellent weatherability mainly, there are used specific weather resistant stabilizers selected phenylbenzoate-based compounds, benzotriazole-based compounds and benzophenone-based compounds known as an ultraviolet absorber, and heterocyclic hindered amine-based compounds known as a hindered amine-based light stabilizer, and they are used alone or in combination so as to satisfy the conditions (1) and (4).

In particular, a combination of the phenylbenzoate-based compound with the heterocyclic hindered amine-based compound is preferable.

Examples of the phenylbenzoate-based compound include phenyl salicylate, p-butylphenyl salicylate, p-octylphenyl salicylate, resorcinol monobenzoate, 2,4-di-t-butylphenyl-3,5-di-t-butyl-4-hydroxybenzoate, 4-octylphenyl-3,5-di-t-butyl-4-hydroxybenzoate and the like. Among-them, 2,4-di-t-butylphenyl-3,5-di-t-butyl-4-hydroxybenzoate is preferable.

Examples of the benzotriazole-based compound include 2-(2'-hydroxy-5'-methylphenyl)benzotriazole, 2-(2'-hydroxy-5'-butylphenyl)benzotriazole, 2-(2'-hydroxy-5'-amylphenyl)benzotriazole, 2-(2'-hydroxy-4'-octoxyphenyl)benzotriazole, 2-(2'-hydroxy-3,5'-di-t-butylphenyl benzotriazole, 2-(2'-hydroxy-3,5'-di-isoamylphenyl) benzotriazoler, 2-(2'-hydroxy-3,5'-di-methylphenyl) benzotriazole, 2-(2'-hydroxy-3-t-butyl-5'-methylphenyl)-5-chlorobenzotriazole, 2-(2'-hydroxy-3,5'-di-t-butylphenyl)-5-chlorobenzotriazole, 2-(2'-hydroxy-3,5'-dichlorophenyl) benzotriazole and the like.

Examples of the benzophenone-based compound include 2-hydroxy-4-methoxybenzophenone, 2-hydroxy-4-octoxybenzophenone, 2-hydroxy-4-stearyloxybenzophenone, 2-hydroxy-4-dodecyloxybenzophenone, 2-hydroxy-4-methoxybenzophenone-5-sulfonic acid, 2-hydroxy-4-methoxy-4'-methylbenzophenone, 2-hydroxy-4-benzoyloxybenzophenone, 5-chloro-2-hydroxybenzophenone, 2,4-dihydroxybenzophenone, 2,2'-dihydroxy-4-methoxybenzophenone, 2,2'-dihydroxy-4,4'-dimethoxybenzophenone, 2,2'-dihydroxy-4-n-octoxybenzophenone and the like.

The heterocyclic hindered amine-based compound is a compound having a hindered amine nitrogen atom and 6-membered hetero-ring containing any other hetero atom, preferably nitrogen or oxygen, in its molecule. Specific examples thereof include bis(2,2,6,6-tetramethyl-4-piperidyl) sebacate, 4-benzoyloxy-2,2,6,6-tetramethylpiperidine, polycondensate of succinic acid with N-(2-hydroxyethyl)-2,2,6,6-tetramethyl-4-hydroxypiperidine, 1,2,3,4-tetra(2,2,6,6-tetramethyl-4-piperidyl)-butanetetracarboxylate, 1,4-di-(2,2,6,6-tetramethyl-4-piperidyl)-2,3-butanedione, tris-(2,2,6,6-tetramethyl-4-piperidyl)trimellitate, 1,2,,2,6,6-pentamethyl-4-piperidylstearate, 1,2,2,6,6-pentamethyl-4-piperidyl-n-octoate, bis(1,2,2,6,6-pentamethyl-4-piperidyl)sebacate, tris-(2,2,6,6-tetramethyl-4-piperidyl)-nitrile acetate, 4-hydroxy-2,2,6,6-tetramethylpiperidine, 4-hydroxy-1,2,2,6,6-pentamethylpiperidine, poly[(6-morpholino-S-triazine-2,4-diyl)][(2,2,6,6-tetramethyl-4-piperidyl)imino]-hexamethylene[(2,2,6,6-tetramethyl-4-piperidyl) imino], poly[[6-(1,1,3,3-tetramethylbutyl)amino-1,3,5-triazine-2,4-diyl][2,2,6,6-tetramethyl-4-piperidyl]imino] examethylene [(2,2,6,6-tetramethyl-4-piperidyl)amino], polycondensate of N,N'-bis(2,2,6,6-tetramethyl-4-piperidyl) hexamethylenediamine with 1,2-dibromoethane, and the like.

The amount of the weather resistant stabilizer added is not particular limited if the composition satisfies the conditions (1) and (4), however, is preferably 0.3 parts by weight or less based on 100 parts by weight of the above-described polypropylene-based resin composition (total of (A), (B) and (C)). When the amount of the weather resistant stabilizer is more than 0.3 parts by weight, adverse effects such as bleeding out on the surface of the molded article and the like are sometimes exerted. The lower limit of the amount of the weather resistant stabilizer can not be determined. But, there is no problem if the conditions (1) and (2) are satisfied. Namely, the composition satisfying the conditions (1) and (2) can be obtained by using the weather resistant stabilizer in a proper amount of not more than 0.3 part by weight.

For the improvement of thermal resistance and weatherability, a specific hindered phenol-based antioxidant is used together with the weather resistant stabilizer.

Typical examples of the hindered phenol-based antioxidant used in the present invention include 3,9-bis-[2-{3-(3-t-butyl-4-hydroxy-5-methylphenyl) propionyloxy}-1,1-dimethylethyl]-2,8,10-tetraoxaspiro[5,5]undecane.

The amount of the hindered phenol-based antioxidant added is preferably 0.01 to 0.2 parts by weight based on 100 parts by weight of the above-described polypropylene-based resin composition (the total of (A), (B) and (C)),r and when the amount is more than 0.2 parts by weight, adverse effects such as bleeding out on the surface of the molded article and the like are sometimes exerted. When the amount added is less than 0.01 part by weight, the effects of the present invention is sometimes not sufficiently accomplished.

The fatty acid amide and/or fatty acid bisamide is used so as to increase the effect of the additives. Especially, in the system in which an inorganic filler is compounded, the thermal oxidation stability and light stability can be extremely improved as disclosed in JP-A-01-282232 and JP-A-01-282233.

Examples of the fatty acid amide or fatty acid bisamide used in the present invention include lauric acid amide, stearic acid amide, oleic acid amide, behenic acid amide, erucic amide, methylenebisstearyl amide, ethylenebisstearylamide, ethylenebisoleylamide, hexamethylenebisstearylamide and the like. The amount added is preferably 0.01 to 0.2 parts by weight based on 100 parts by weight of the above-described polypropylene-based resin composition (the total of (A),(B) and (C)).

As the antistatic agent used in the present invention, there can be used an antistatic agent which can give the polypropylene-based resin composition having an antistatic ability and a small thermal vaporization property specified in the present invention. Exemplified examples of the antistatic agent include a composition composed of ① 35 to 55 parts by weight of a glycerin monofatty acid ester having a monoester content of 90% by weight or more (wherein, the fatty acid has a carbon number composition of a range from $C_{16}$ to $C_{18}$ and a $C_{18}$ component content of 50% by weight or more), ② 40 to 60 parts by weight of a diglycerin fatty acid ester obtained by reacting diglycerin with 1.0 to 1.5 mol of a fatty acid having a carbon number composition of a range from $C_{16}$ to $C_{18}$ and a $C_{18}$ component content of 50% by weight or more per one mol of diglycerin, and ③ 3 to 10 parts by weight of an alkyldiethanolamine having an alkyl group composition of a range from $C_{16}$ to $C_{18}$ and a $C_{18}$ component content of 50% by weight or more, the total amount of ①, ② and ③ being 100 parts by weight.

The amount added is usually 0.1 to 2.0 parts by weight, preferably 0.1 to 2.0 parts by weight based on 100 parts by weight of the above-described polypropylene-based resin composition (the total of (A),(B) and (C)), and when the amount added is less than 0.01 parts by weight, the sufficient antistatic ability can not be accomplished. On the other hand, when the amount is more than 2.0 parts by weight, the antistatic property is not improved moreover, and economical disadvantage exists.

In the composition of the present invention, other additives, for example, a lubricant, pigment, copper poison preventing agent, flame retardant, processing oil, neutralizing agent, antioxidant, heavy metal deactivator, releasing agent, foaming agent, plasticizer, nucleus forming agent, defoaming agent, crosslinking agent and anti-fungus agent, or the like can be added, provided they do not disturb the properties of the composition.

The polypropylene-based resin composition of the present invention is prepared by mixing the predetermined components as above. The mixing is preferably carried out by kneading under heat-melted condition using a kneading machine such as a single screw extruder, twin screw extruder, Banbury mixer, heating roll, Brabender or kneader, or the like.

The polypropylene-based resin composition of the present invention can be made into an injection molded article by a conventional injection molding.

EXAMPLE

The present invention will be explained more detail using the following examples. However, the present invention is not limited thereto.

Physical properties in examples were measured by the following method.

(1) weatherability

An accelerated weatherability(weather resistance) test was conducted using Sunshine Super Long Life Weather Meter (WEL-SUN-DC type, manufactured by Suga Testing Machine Corp.) according to JIS B 7753. Time when appearance disorders such as cracking and the like occur on the surface of a test piece was measured.

Test conditions are as follows:
① Test piece size; 70 mm×25 mm×1 mm (thickness) press sheet
② Black panel temperature; 83° C.
③ Spray/dry cycle; 18 minutes/120 minutes
④ Humidity in test vessel; 50% RH
⑤ Observation of appearance disorders such as cracking and the like; observation by a microscope (magnufication;50)

(2) Thermal resistance

Evaluation of thermal resistance was conducted according to JIS K 7212 [General rules for thermal aging properties in the form of sheet by means of ovens]. Measurement was conducted at 150° C. using a gear oven manufactured by Toyo Seiki Seisakusho Ltd. Time required until the test piece (press sheet having a thickness of 1 mm) completely degraded, in other word, time required until tensile strength became 0 (Gear oven life) was measured.

(3) Antistatic. property

Surface resistivity of a sample was measured using a super insulation tester (manufactured by Kawaguchi Denki Seisakusho Corp., R-503 type) with measuring electrodes (manufactured by Kawaguchi Denki Seisakusho Ltd., P-616 type) according to JIS K 6911. A flat test piece having a thickness of 3 mm obtained by injection molding was subjected to measurement as a sample.

(4) Thermal vaporization property

Measurement was conducted by glass haze property accelerating test according to ASTM-E308. 25 mm×100 mm×2 mm (thickness) injection molded test sheet was placed in a misting point measuring pressure bottle (manufactured by Kyoei Rika Corp.) having an inner volume of 50 ml, and the bottle was tightly closed with a glass plate, then, immersed in a silicon oil bath and was heated to 100±2° C. for 20 hours.

After completion of the test, glass haze degree of the glass plate was measured using an integrating sphere type light transmittance measuring apparatus (manufactured by Toyo Seiki Seisakusho Corp., direct reading haze meter).

The test pieces for evaluation of physical properties of (2), (3) and (4) were prepared under the following injection molding conditions unless otherwise stated. Namely, the composition was dried for 20 hours at 120° C. by a hot air dryer, then subjected to injection molding using IS150E-V type injection molding machine manufactured by Toshiba Machine Co., Ltd., molten resin temperature of 220° C., mold temperature of 50° C., injection time of 15 second and cooling time of 30 second.

The following compositions were prepared under conditions described below unless otherwise stated. The predetermined amount of each component was measured premixed with a Henschel mixer and tumbler, then treated by a twin screw kneading extruder (TEX44SS 30BW-2V type manufactured by The Japan Steel Works, Ltd.) at an extruded amount of 50 kg/hr, screw rotating speed of 350 rpm under bent suction. The screw was so constituted that three-stripe type rotors and kneading discs were placed at two kneading zones, in detail, the following zones at a first feed port and a second feed port, respectively.

Basic formulations for resins, inorganic fillers and additives are as follows.

1. Basic formulation for resin, rubber and inorganic filler (Formulation 1)
(1) crystalline ethylene-propylene block copolymer: 65% by weight A crystalline polypropylene portion of this copolymer has an intrinsic viscosity $[\eta]_p$ of 1.03 and an isotactic pentad fraction calculated by $^{13}$C-NMR of 0.98. (manufactured by Sumitomo Chemical Co., Ltd., trade name: Norbrene:WPZ5344)

(2) Ethylene-butene random copolymer rubber: 15% by weight (manufactured by Sumitomo Chemical Cc., Ltd., trade name: Esprene SPo:N0394)

(3) Talc: 20% by weight (manufactured by Hayashi Kasei Corp., trade name: Micron White: 5000S)

2. Basic formulation of additives (Formulation 2)
(1) Calcium stearate: 0.05 part by weight
(2) Dimyristyl-thio-dipropionate: 0.03 part by weight
(3) 2,4-di-t-butylphenyl-3,5-di-t-butyl-4-hydroxy benzoate: 0.05 part by weight Examples 1 to 3 and Comparative Examples 1 to 5

The additives according to the formulation 2 and the other additives shown in Table 1 were mixed with 100 parts by weight of the composition of the formulation 1, and the resulting mixture was kneaded, molded, and various abilities of the resulted molded article were evaluated. Kinds and names of the additives used in Table 1 are as follows. Evaluation results of abilities are also shown in Table 1.

1. Antioxidant
   A: 3,9-bis-[2-{3-(3-t-butyl-4-hydroxy-5-methylphenyl) propionyloxy}-1,1-dimethylethyl]-2,8,10-tetraoxaspiro[5,5]undecane
2. Weather resistant agent
   A: bis(2,2,6,6-tetramethyl-4-piperidyl)sebacate
   B: poly[[6-(1,1,3,3-tetramethylbutyl)amino-1,3,5-triazine-2,4-diyl][2,2,6,6-tetramethyl-4-piperidyl]imino]hexamethylene[(2,2,6,6-tetramethyl-4-piperidyl)amino]
3. Fatty acid bisamide
   Ethylene bis stearic acid amide
4. Antistatic agent
   A: A composition composed of ① 50 parts by weight of a glycerin monofatty ester having a monoester content of 93% by weight ($C_{18}$ component content: 65% by weight), ② 45 parts by weight of a diglycerin fatty acid ester obtained by reacting diglycerin with 1.2 mol of a fatty acid having a $C_{18}$ component content of 65% by weight per one mol of diglycerin, and ③ 5 parts by weight of an alkyldiethanolamine having a $C_{18}$ component content of 65% by weight in the alkyl group composition.
   B: A mixture of a glycerin fatty acid ester and stearyl-diethanolamine monostearate
   C: A mixture of a glycerin fatty acid ester, N,N-bis(2-hydroxyethyl)fatty acid amine, straight-chain saturated fatty acid monohydric alcohol and $SiO_2$.

TABLE 1

| | Additives formulation (parts by weight) | | | | | | | Ability evaluation (note 1) | | | |
|---|---|---|---|---|---|---|---|---|---|---|---|
| | Anti-oxidant | Weather resistant agent | | Fatty acid | Anti-static agent | | | Weather resistance | Heat resistance | Anti-static property | Heat vaporization property |
| Example | A | B | C | bisamide | A | B | C | Hr | Hr | Ω | % |
| Example 1 | 0.05 | 0.1 | | 0.03 | 0.1 | | | 800 | 750 | 2 × 10$^{15}$ | 8.2 |
| Example 2 | 0.05 | | 0.1 | 0.03 | 0.1 | | | 560 | 1200 or more | 2 × 10$^{15}$ | 7.5 |
| Example 3 | 0.05 | | 0.1 | 0.03 | 0.3 | | | 560 | 1200 or more | 7 × 10$^{10}$ | 11.7 |
| Comparative Example 1 | 0.05 | | | 0.03 | 0.1 | | | 50 | 750 | 2 × 10$^{15}$ | 7.0 |
| Comparative Example 2 | 0.05 | | 0.1 | | 0.1 | | | 300 | 20 | 3 × 10$^{15}$ | 6.8 |
| Comparative Example 3 | 0.05 | | 0.1 | 0.03 | | 0.3 | | 560 | 1200 or more | 4 × 10$^{15}$ | 39.5 |

TABLE 1-continued

|  | Additives formulation (parts by weight) | | | | | | | Ability evaluation (note 1) | | | |
| --- | --- | --- | --- | --- | --- | --- | --- | --- | --- | --- | --- |
|  | Anti-oxidant | Weather resistant agent | | Fatty acid bisamide | Anti-static agent | | | Weather resistance | Heat resistance | Anti-static property | Heat vaporization property |
| Example |  | A | B | C |  | A | B | C | Hr | Hr | Ω | % |
| Comparative Example 4 | 0.05 |  | 0.1 |  | 0.03 |  |  | 0.3 | 560 | 1200 or more | 7 × 10$^{15}$ | 19.7 |
| Comparative Example 5 | 0.05 |  | 0.1 |  | 0.03 |  |  | 0.5 | 560 | 1200 or more | 3 × 10$^{13}$ | 43.3 |

(Note 1) Ability evaluation method
Weather resistance: Sunshine weather meter, 83° C. water existing
Heat resistance: 150° C. gear oven life
Antistatic property: surface resistivirity
Heat vaporization property: glass misting property 100° C. × 20 Hr The polypropylene-based resin composition of the present invention is excellent in weatherability, thermal resistance and antistatic property and has a small thermal vaporization property.

Especially, the composition of the present invention has a remarkably improved balance between antistatic property and thermal vaporization property due to use of a specific antioxidant and antistatic agent, and can manifest the effects in injection molding article field including mainly industrial parts.

What is claimed is:

1. A polypropylene-based resin composition comprising:
   (A) 50% by weight or more of a polypropylene-based resin;
   (B) 1 to 40% by weight of an inorganic filler; and
   (C) 0 to 40% by weight of an ethylene-α-olefin random copolymer rubber and/or a vinyl aromatic compound-containing rubber, the total amount of (A), (B), and (C) being 100% by weight;
   (D) a hindered phenol-based antioxidant of 0.01 to 0.2 parts by weight per 100 parts by weight of the total amount of (A), (B) and (C);
   (E) a weather resistant stabilizer of 0.3 parts by weight or less per 100 parts by weight of the total amount of (A), (B) and (C);
   a fatty acid amide and/or fatty acid bisamide of 0.01 to 0.2 parts by weight per 100 parts by weight of the total amount of (A), (B) and (C); and
   (F) an antistatic agent of 0.01 to 2.0 parts by weight per 100 parts by weight of the total amount of (A), (B) and (C), which is composed of (1) 35 to 55 parts by weight of a glycerin monofatty acid ester having a monoester content of 90% by mole or more, wherein the fatty acid has a carbon number composition of a range from $C_{16}$ to $C_{18}$ and a $C_{18}$ component content of 50% by weight or more, (2) 40 to 60 parts by weight of a diglycerin fatty acid ester obtained by reacting diglycerin with 1.0 to 1.5 mol of a fatty acid having a carbon number composition of a range from $C_{16}$ to $C_{18}$ and a $C_{18}$ component content of 50% by weight or more per one mole of diglycerin, and (3) 3 to 10 parts by weight of an alkyldiethanolamine having an alkyl group composition of a range from $C_{16}$ to $C_{18}$ and a $C_{18}$ component content of 50% by weight or more, the total amount of (1), (2) and (3) being 100 parts by weight of the antistatic agent; and said composition satisfying the following conditions (1) to (4):
   (1) the weatherabiltiy (Sun shine weather meter, 83° C.-water existing) measured according to JIS B 7753 of the polypropylene-based resin composition is 500 hours or more;
   (2) the thermal resistance measured at 150° C. according to JIS K7212 is 700 hours or more;
   (3) the antistatic property (surface resistivity according to JIS K 6911) is 2×10$^{15}$ Ω or less; and
   (4) the thermal vaporization property (Glass misting degree according to ASTM-E308, 100° C.×20 hours) is 15% or less.

2. The polypropylene-based resin composition according to claim 1, wherein the polypropylene-based resin is an ethylene-propylene block copolymer composed of a crystalline polypropylene portion and an ethylene-propylene random copolymer portion, and the crystalline polypropylene portion has an intrinsic viscosity $[\eta]_p$ of 0.8 to 2.0 [dl/g] and an isotactic pentad fraction calculated by $^{13}$C-NMR of 0.97 or more.

3. The polypropylene-based resin composition according to claim 1, wherein the hindered phenol-based antioxidant is 3,9-bis-[2-{3-(3-t-butyl-4-hydroxy-5-methylphenyl)propionyloxy}-1,1-dimethylethyl]-2,8,10-tetraoxaspiro[5,5]undecane.

4. An injection-molded article obtained by injection-molding of the polypropylene-based resin composition of claim 1.

* * * * *